Figure 1:
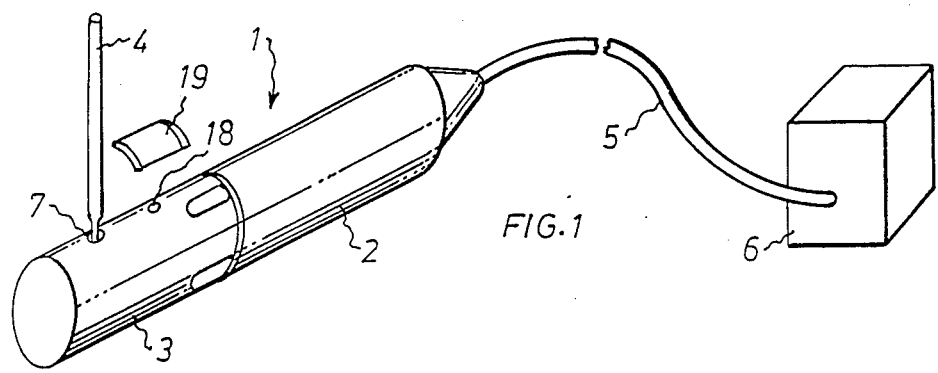

United States Patent [19]

Wikström et al.

[11] Patent Number: 4,924,066
[45] Date of Patent: May 8, 1990

[54] COOLING DEVICE

[76] Inventors: Rolf Wikström, Vintergatan 5 C; Erik Sjölund, Johannesvägen 4, both of S-891 00 Örnsköldsvik, S-89100, Sweden

[21] Appl. No.: 382,693
[22] PCT Filed: Dec. 28, 1988
[86] PCT No.: PCT/SE88/00709
§ 371 Date: Aug. 1, 1988
§ 102(e) Date: Aug. 1, 1988
[87] PCT Pub. No.: WO89/06582
PCT Pub. Date: Jul. 27, 1989

[30] Foreign Application Priority Data

Jan. 13, 1988 [SE] Sweden ............................... 8800083

[51] Int. Cl.⁵ .................................................. B23K 9/32
[52] U.S. Cl. ..................................... 219/142; 219/136
[58] Field of Search ................ 219/138, 142, 143, 136, 219/140

[56] References Cited

U.S. PATENT DOCUMENTS 2,350,614 6/1944 Jackson ............................... 219/138
2,692,324 10/1954 Strackbein et al. ................. 219/142

Primary Examiner—Clifford C. Shaw
Attorney, Agent, or Firm—Shapiro and Shapiro

[57] ABSTRACT

The present invention relates to a device for cooling an electrode holder (1) for manual arc welding with coated electrodes, as well as the electrode (4) and the electric supply cable (5), said cable (5) being surrounded by a tube (10), and said electrode holder (1) comprising a handle (2) provided with a projecting electrode pin (11) having threads (12) and a conical tip (13), and a top part (3) having a bore (16) provided with threads (17) and arranged to receive the electrode pin (11), and a fixing hole (7) extending away from and at right angles to the bore (16) to the periphery of the top part (3), the conical tip (13) of the electrode pin (11) being adapted to urge an electrode (4) inserted in the fixing hole (7), into line or point contact with the wall of the fixing hole. According to the invention, the electrode pin (11) has a channel (15) connecting the inlet end of the tube (10) in the electrode holder (1) to the fixing hole (7) for the electrode (4), cooling gas, preferably air, which is supplied to the end of the tube (10) remote from the electrode holder (1), flowing through the tube (10) and the channel (15) in the electrode pin (11) and being caused to flow out around substantially the entire circumferential portion of the electrode (4) in the fixing hole (7) therefor, and out from said fixing hole (7).

2 Claims, 1 Drawing Sheet

U.S. Patent  May 8, 1990  4,924,066

COOLING DEVICE

The present invention relates to a device for cooling both the electrode holder for manual arc welding with coated electrodes, and the electrode as well as the electric supply cable. Cooling is effected by conducting cooling gas, preferably air, through the device.

A number of welding techniques are previously known in which, for different reasons, a gas is supplied to the welding point. For example, MIG or MAG welding is performed fully or semi-automatically with a welding gun in which a wire electrode is fed from a bobbin via a feeding mechanism. The melt and the feed of material in the electric arc are protected by an inert gas. The handle can be cooled by compressed air which is also used for driving the electrode feeding mechanism. Air must under no circumstances come into contact with the arc or the melt. Since compressed air and protective gas are supplied to the welding gun through separate conduits, no cooling is effected in accordance with the method of the present invention.

U.S. Pat. No. 2,975,267 relates to an electric welding device with air cooling in which a portion of the supply cable is surrounded by a channel through which air from the atmosphere flows, which is intended to cool the handle by discharging through the holes in the handle. Neither the electrode nor the electrode attachment is cooled by an air flow.

The present invention provides cooling of the components which, from technical aspects, are the most essential to cool, i.e. also the electrode attachment and the electrode. This is not the case in the device disclosed in U.S. Pat. No. 2,975,267. By cooling the entire cable arrangement according to the present invention, i.e. the male connection at the power source, the entire electric supply cable, the electrode holder as well as the electrode with the attachment, the area of the electric conductor can be reduced by about 30%, and the electrode holder can be reduced, for instance from 600 A to 450 A. This is not possible with the device according to U.S. Pat. No. 2,975,267. Moreover, the current intensity can be increased by about 50% as compared with the maximum current intensity recommended by the electrode manufacturer. Nor is this possible with the known device.

U.S. Pat. No. 2,935,597 relates to an electric cutting device using a carbon electrode for melting the workpiece and a vigorous air stream for blowing away the molten material. As opposed to such a vigorous air stream, the air stream from the fixing hole of the electrode according to the present patent application is relatively faint and the flow of air small, viz. in the order of 20 l/min. The air stream is sufficient to form a curtain against the welding fumes immediately underneath the electrode holder, but the air stream is so faint that it will never reach the welding point. In the device according to U.S. Pat. No. 2,935,597, the air flows in through a conduit 26 adajcent the handle 32, through the tubular member 22 and into the chamber 38 of the mounting head 37. Here, the air flow is divided into two currents one of which discharges through the hole 42 at right angles to the electrode 41 and the other of which discharges at a high velocity through the hole 44 parallel to the electrode. The air flows from the chamber 38, through the hole 42 and into the space formed by the electrode 41, the groove 40 and the ridges 39. Thus, only the circumferential surface of the electrode located between the ridges will be cooled, i.e. no more than about 25% of the circumferential surface of the electrode is cooled. Since the air discharges at a high velocity through the hole 44 which is oriented parallel to the electrode, the major portion of this air stream will flow parallel to the longitudinal direction of the electrode towards the welding point. According to the embodiment of the present invention as here presented, the electrode is retained in the fixing hole by the conical tip of the electrode pin urging the electrode into line or point contact with the opposite wall of the fixing hole. The air flows through the channel in the electrode pin into the fixing hole and discharges around the entire circumferential portion of the electrode in the fixing hole thereof, with the exception of said line or point contact area and the point contact area of the conical tip with the electrode.

U.S. Pat. No. 2,443,592 relates to an electrode holder for high currents (>500 A). The electrode holder comprises a handle and a top part. The top part has a sleeve with a pair of through holes and a spring-biased plunger having a V-shaped groove at its tip. In order to mount an electrode in the electrode holder, a handle is depressed so as to retract the plunger in the sleeve. The holes are then exposed and the electrode is inserted therein. When the handle is released, the spring urges the plunger forwards and the electrode is clamped between the forward circumferential portion of the holes and the groove. A stream of air is introduced through the supply pipe line and is divided into two currents one of which discharges through the slots in the handle and the other of which discharges through the top part in the gap between the sleeve and the plunger. The electrode then is received in the holes and the V-shaped groove, the remaining surface of the holes being covered by the front portion of the plunger. The remaining free surface of the holes, through which the air can leave the top part, thus is very limited. Because of this and the gap between the sleeve and the plunger, the major part of the air will leave through the slots since the air streams follow the line of least resistance. Thus, the air would only "leak" through the holes around the electrode on each side of the top part.

The present invention relates to manual arc welding with coated electrodes, i.e. a method in which coated electrodes of varying length and diameter are melted down by an arc maintained between the electrode tip and a workpiece. The problem in such welding technique is, inter alia, that the handle of the welding apparatus becomes excessively hot and that the electrode becomes red-hot, which means that the electrode is burnt off, leaving a substantial part of the electrode unfit for use, which means a reduction of the use-value. The first-mentioned problem, i.e. an overheated handle, is generally solved by the welder using two or three pairs of protective gloves against the heat from the electrode holder. Despite this, the electrode holder must be cooled after welding with three consecutive electrodes and so, the electrode holder is generally thrown into a bucket of water, with consequent formation e.g. of steam and odours. Moreover, the strain on the electrode holder and the attachment portion of the welding current supply cable at the electrode holder becomes considerable, for which reason the electrode holder must generally be discarded after about 12 hours of use.

The problem of decreased use-value can be solved by lowering the current intensity, which however means that the melting time of the electrode is prolonged, i.e.

impaired welding economy. Further, in manual welding there is always the problem of welding fumes rising from the welding point towards the welder.

The object of the present invention thus is to overcome the above-mentioned drawbacks in prior art welding equipments for manual arc welding by providing a device which makes the equipment lighter involving ergonomic advantages, less expensive, environmentally improved from the point of view of overheating, and which considerably extends the life of the electrode holder. Further, the invention provides in the welding operation an air curtain protecting the welder from the welding fumes. This is achieved by a device having the features stated in the appended claims.

Figure 2:
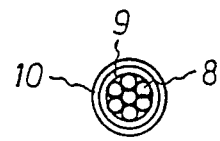
Figure 3:
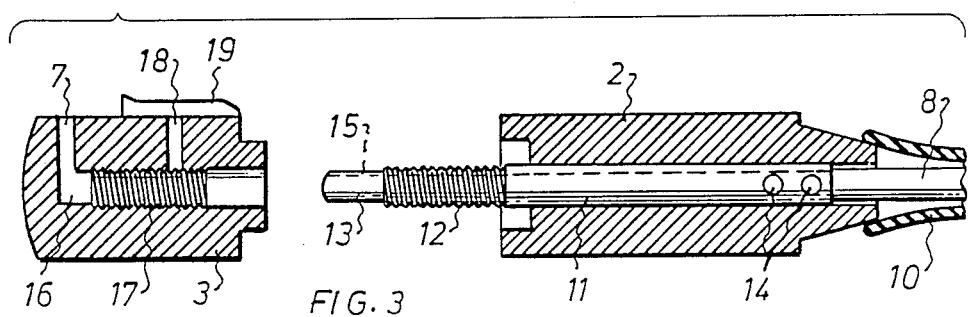

A preferred embodiment of the invention will now be described hereinbelow by an example with reference to the accompanying drawing, in which FIG. 1 is a schematic perspective view of a welding equipment designed according to the invention, FIG. 2 is a section of an embodiment of an electric supply cable according to the invention, and FIG. 3 is a section of an electrode holder designed in accordance with the invention.

The device according to the present invention comprises an electrode holder 1 consisting of a handle 2 and a top part 3. Further, the device comprises a coated electrode 4, an electric supply cable 5 and a welding current supply assembly 6. The electrode is fixed in the electrode holder 1 by insertion in a fixing hole 7 in the top part 3 of the electrode holder. The cable 5 supplies in conventional manner the electrode holder with welding current from the assembly 6.

According to the invention, the welding equipment is cooled by a gas, preferably air, which is conducted through the different components. To this end, the welding current supply assembly 6 is provided with suitable means for supplying air through the cable to the electrode holder. The cable 5 must thus be able to allow passage of the air from the assembly 6 to the electrode holder 1. A suitable embodiment of the cable is shown in sectional view in FIG. 2. According to this embodiment, the cable comprises an electric conductor 8 surrounded by an insulation 9. Outside the insulation, a tube 10 is provided so as to form a space between the inner side of the tube and the insulation, the cooling gas being conducted through this space. On account of the efficient cooling, the insulation 9 need not be as thick as in conventional welding current supply cables, but may consist only of a thin, partially or completely covering protective layer. The electric insulation with respect to the surroundings is instead provided by the tube 10.

FIG. 3 shows a section of an electrode holder designed in accordance with the invention. In the handle 2 of the electrode holder, an electrode pin 11 is non-rotatably fixed. The electrode pin extends outside the handle and has a thread 12 outside which it terminates in a tip 13. The electrode pin further comprises a fixing device 14 for connecting the conductor 8 of the supply cable to the electrode pin. Moreover, the tube 10 of the cable is connected to the handle 2 in a suitable manner. In order to permit passage of the cooling gas through the handle, a channel 15 is provided in a suitable manner in the electrode pin, for instance by milling, bevelling or drilling.

The top part 3 of the electrode holder has a bore 16 and a thread 17 for receiving the tip 13 of the electrode pin 11 and the corresponding thread 12. On a level with the bottom of the bore 16, the fixing hole 7 for the electrode is formed orthogonally in the top part 3. In use, the top part 3 is screwed on the electrode pin 11 of the handle 2, and an electrode 4 inserted in the fixing hole 7 is clamped between the tip 13 and the bottom of the bore 16. The handle 2 and the top part 3 also are so shaped that they will fit tightly to each other.

Cooling gas which is introduced through the welding current supply assembly 6 passes through the cable 5 and into the electrode holder 1 via the channel 15 in the electrode pin 11 of the handle 2 and further into the top part 3. From there the gas flows out through the fixing hole 7 in the gap existing between the electrode 4 and the fixing hole 7, and flows along the electrode as a conical gas curtain with an acute angle at the handle, protecting the welder from the welding fumes. This gas curtain never contacts the welding point. In addition, a transverse bore 18 may be provided in the top part 3 to further enhance the cooling of the electrode. A guide baffle 19 may be provided on the top part 3 outside the bore 18 in order to guide the air flow through the bore 18 in a suitable manner.

Thanks to the efficient cooling of both the electrode holder and the electrode as well as the electric supply cable, welding economy is considerably improved with the device according to the invention. Thus, the handle can be used continuously without any need to replace the handle because of overheating. The electrode is efficiently cooled by the gas discharging through the fixing hole of the electrode. In this manner, the electrode will no longer become red-hot but can be used to a greater extent, i.e. its use-value increases. Because of the efficient cooling of the cable, the current intensity can be increased, meaning a decrease of the melting time of the electrode and improved welding economy. Instead of increasing the current intensity, the conductor area of the cable may alternatively be reduced, which makes it easier to handle the equipment.

It goes without saying that the invention is not restricted to the embodiment described above and illustrated in the drawing, but may be modified within the scope of the accompanying claims.

We claim:

1. A device for cooling an electrode holder (1) for manual arc welding with coated electrodes, as well as the electrode (4) and the electric supply cable (5), said cable (5) being surrounded by a tube (10), and said electrode holder (1) comprising a handle (2) provided with a projecting electrode pin (11) having threads (12) and a conical tip (13), and a top part (3) having a bore (16) provided with threads (17) and arranged to receive the electrode pin (11), and a fixing hole (7) extending away from and at right angles to the bore (16) to the periphery of the top part (3), the conical tip (13) of the electrode pin (11) being adapted to urge an electrode (4) inserted in the fixing hole (7), into line or point contact with the wall of the fixing hole, characterised in that the electrode pin (11) has a channel (15) connecting the inlet end of the tube (10) in the electrode holder (1) to the fixing hole (7) for the electrode (4), cooling gas, preferably air, which is supplied to the end of the tube (10) remote from the electrode holder (1), flowing through the tube (10) and the channel (15) in the electrode pin (11) and being caused to flow out around substantially the entire circumferential portion of the electrode (4) in the fixing hole (7) therefor, and out from said fixing hole (7).

2. Device as claimed in claim 1, characterised in that the supply cable (5) comprises an electric conductor (8) with a thin, partially or completely covering protective layer (9) surrounded by the tube (10) which forms a sheath for the electric conductor (8) and at the same time serves as an electric insulation therefor.

* * * * *